US012764797B2

(12) United States Patent
Kalhan

(10) Patent No.: US 12,764,797 B2
(45) Date of Patent: Oct. 13, 2026

(54) CODED SLOTTED ACCESS BASED RANDOM-ACCESS SCHEME

(71) Applicant: Kyocera Corporation, Kyoto (JP)

(72) Inventor: Amit Kalhan, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 278 days.

(21) Appl. No.: 18/687,415

(22) PCT Filed: Oct. 20, 2022

(86) PCT No.: PCT/US2022/047307
§ 371 (c)(1),
(2) Date: Feb. 28, 2024

(87) PCT Pub. No.: WO2023/076102
PCT Pub. Date: May 4, 2023

(65) Prior Publication Data

US 2024/0430941 A1 Dec. 26, 2024

Related U.S. Application Data

(60) Provisional application No. 63/272,478, filed on Oct. 27, 2021.

(51) Int. Cl.
*H04W 4/00* (2018.01)
*H04W 52/10* (2009.01)
*H04W 74/0833* (2024.01)

(52) U.S. Cl.
CPC ....... *H04W 74/0833* (2013.01); *H04W 52/10* (2013.01); *H04W 74/0841* (2013.01)

(58) Field of Classification Search
CPC ......... H04W 74/0833; H04W 74/0841; H04W 52/10; H04W 52/242; H04W 52/40
See application file for complete search history.

(56) References Cited

U.S. PATENT DOCUMENTS

2006/0239239 A1 10/2006 Yang
2020/0029368 A1* 1/2020 Yang ................ H04W 56/0005
(Continued)

FOREIGN PATENT DOCUMENTS

KR 10-2021-0124243 A 10/2021

OTHER PUBLICATIONS

Hai Yu, Jun Zou, Chen Xu; "Power-Efficient Random Access Design for Machine Type Communication"; Electronics 2018, 7, 286, MDPI; Oct. 30, 2018.

*Primary Examiner* — Abdelnabi O Musa

(57) ABSTRACT

The devices, systems, and methods discussed herein reduce latency and the signaling overhead by having a base station transmit, to a first UE device prior to the first UE device entering a sleep state, at least one message containing Random-Access Channel (RACK) resource pool configuration information. The base station receives, from the first UE device, a plurality of copies of a first Random-Access Request Signal (RRS) transmitted in a first set of resources selected from the RACK resource pool. The base station also receives, from a second UE device, a plurality of copies of a second RRS transmitted in a second set of resources selected from the RACK resource pool. After decoding the RRS transmissions, the base station transmits, to the first UE device, an uplink grant containing a time-adjustment command.

23 Claims, 6 Drawing Sheets

(56) References Cited

U.S. PATENT DOCUMENTS

| | | | | |
|---|---|---|---|---|
| 2020/0236720 | A1 | 7/2020 | Hong | |
| 2020/0367294 | A1* | 11/2020 | Wong | H04W 48/16 |
| 2020/0383146 | A1 | 12/2020 | Zhang et al. | |
| 2021/0112603 | A1* | 4/2021 | Xue | H04L 5/0053 |
| 2021/0168869 | A1* | 6/2021 | Gupta | H04B 7/18504 |
| 2022/0117002 | A1* | 4/2022 | Dallal | H04W 56/001 |
| 2022/0330348 | A1* | 10/2022 | Wei | H04W 74/006 |
| 2022/0386380 | A1* | 12/2022 | He | H04W 74/006 |
| 2024/0284193 | A1* | 8/2024 | Matsumura | H04W 56/001 |
| 2024/0324017 | A1* | 9/2024 | Sun | H04L 5/0048 |

* cited by examiner

CODED SLOTTED ACCESS BASED RANDOM-ACCESS SCHEME

CLAIM OF PRIORITY

The present application claims priority to Provisional Application No. 63/272,478, entitled "New Random-Access Scheme," filed Oct. 27, 2021, which is assigned to the assignee hereof and hereby expressly incorporated by reference in its entirety.

FIELD

This invention generally relates to wireless communications and more particularly to Random-Access procedures performed by user equipment devices.

BACKGROUND

In a wireless network, a user equipment (UE) device in a sleep state that has a data packet for uplink transmission must wake up, obtain accurate synchronization, and perform a Random-Access procedure before transmitting the data packet.

SUMMARY

The devices, systems, and methods discussed herein reduce latency and the signaling overhead by having a base station transmit, to a first UE device prior to the first UE device entering a sleep state, at least one message containing Random-Access Channel (RACH) resource pool configuration information. The base station receives, from the first UE device, a plurality of copies of a first Random-Access Request Signal (RRS) transmitted in a first set of resources selected from a RACH resource pool. The base station also receives, from a second UE device, a plurality of copies of a second RRS transmitted in a second set of resources selected from the RACH resource pool. After decoding the RRS transmissions, the base station transmits, to the first UE device, an uplink grant containing a time-adjustment command.

Figure 1:
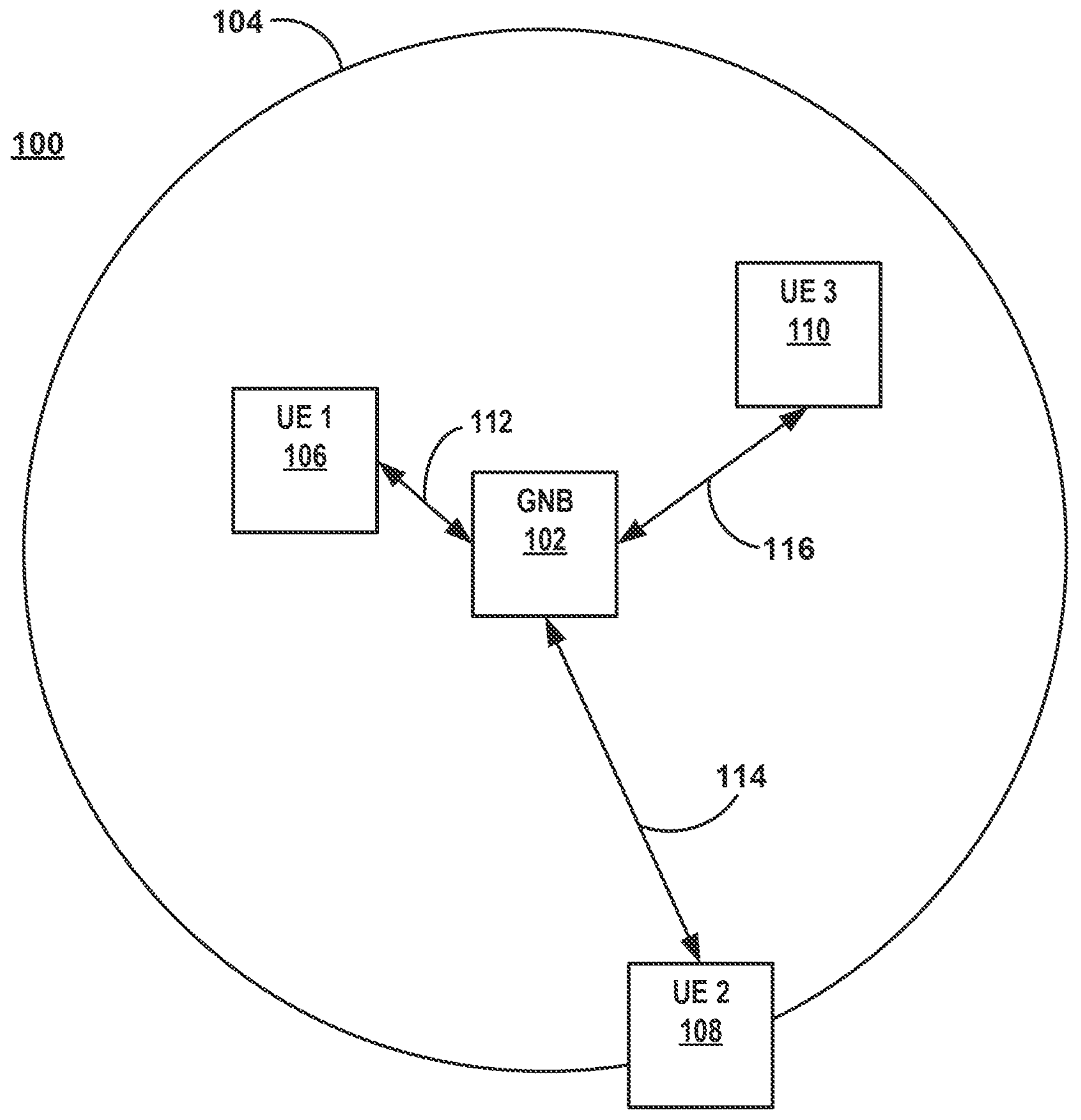
FIG. 1 is an example of a system in which a base station receives Random-Access Request Signals from a plurality of user equipment (UE) devices located in a coverage area provided by the base station.

The base station receives, from the first UE device, a plurality of copies of a first RRS transmitted in a first set of resources selected from a RACH resource pool. The base station also receives, from a second UE device, a plurality of copies of a second RRS transmitted in a second set of resources selected from the RACH resource pool. After decoding the RRS transmissions, the base station transmits, to the first UE device, an uplink grant containing a time-adjustment command.

DETAILED DESCRIPTION

When a data packet arrives from the higher layers for uplink transmission, a user equipment (UE) device wakes up to access the network. Upon waking, the UE device turns ON its transceiver (e.g., a combined radio transmitter and receiver), acquires timing by successfully receiving the downlink synchronization channel from the network, and then waits for the Random-Access Channel (RACH) resources to perform a Random-Access (RA) procedure. In the current 5G New Radio (NR) communication specification, there are two random access procedures.

The first RA procedure is a 4-Step RA procedure. In the 4-Step RA procedure, the UE device transmits a preamble sequence in the RACH resources using the Physical RACH (PRACH) as the first step. As a response on successfully detecting the PRACH, the network sends the RA Response (RAR) message indicating reception of the RACH and also provide a time-alignment command adjusting the transmission timing of the UE device based on the timing of the received preamble.

There are additional subsequent message exchanges, referred to as message 3 (Msg 3) and message 4 (Msg 4), from the UE device and the base station, respectively. The aim of Msg 3 and Msg 4 is to resolve the potential collisions that could occur due to transmission of the same preamble from multiple UE devices within the cell. After successfully receiving the Msg 4, the UE device transfers from the Idle state to the Connected state.

In the 5G NR Release-16, a new 2-Step RA procedure was introduced. The 2-Step RA procedure has the advantage of reducing latency, allowing the UE device to transmit the preamble and the payload as one message A (Msg A). Msg A contains a preamble on PRACH and a payload on Physical Uplink Shared Channel (PUSCH). The payload corresponds to Msg 3 in the 4-Step RA procedure.

After transmitting Msg A, the UE device waits for message B (Msg B) from the base station on the Physical Downlink Shared Channel (PDSCH) for the configured window. Upon successful detection of Msg A, the base station notifies the UE device of contention resolution by sending a successful RAR with a time-alignment command in Msg B. The Msg A includes the preamble on a PRACH resource and the time-frequency resource for the PUSCH payload, time-frequency resource size of the PUSCH, etc. Additionally, in 5G NR the RACH resources are mapped to the Synchronization Signal Block (SSB) for beam association. As a result, the payload of Msg A is indirectly mapped to the SSB index as well.

In the 2-Step RA procedure, the UE device does not have the time-alignment to transmit the payload PUSCH part of Msg A. Thus, the UE device transmits the payload with the time adjustment of zero. The base station receives this uplink transmission with a delay depending on the distance between the UE device and the base station. In most cases, the delay is not an issue as long as the beginning of the received uplink transmission is within the Cyclic Prefix (CP)

duration. However, in order to avoid inter-symbol interference (ISI) to the next symbol caused by receiving the uplink transmission with a delay greater than the CP duration, an optional Guard Period (GP) of 0 to 3 symbols is added to the end of the payload PUSCH transmission.

The 4-Step RA procedure has a large latency due to the multiple message exchanges between the UE device and the network. Although the 2-Step RA procedure is better in terms of latency, both methods still have a problem when the base station detects identical preambles in the same RACH resources from different UEs with similar distances from the base station. When the same preamble is detected, the base station is unable to successfully detect the payload and to determine the time-alignment command for each UE device. Therefore, an improved RA scheme is required.

The devices, systems, and methods discussed herein reduce latency and the signaling overhead by having a base station transmit, to a first UE device prior to the first UE device entering a sleep state, at least one message containing RACH resource pool configuration information. The base station receives, from the first UE device, a plurality of copies of a first Random-Access Request Signal (RRS) transmitted in a first set of resources selected from a RACH resource pool. The base station also receives, from a second UE device, a plurality of copies of a second RRS transmitted in a second set of resources selected from the RACH resource pool. After decoding the RRS transmissions, the base station transmits, to the first UE device, an uplink grant containing a time-adjustment command.

Although the different examples described herein may be discussed separately, any of the features of any of the examples may be added to, omitted from, or combined with any other example. Similarly, any of the features of any of the examples may be performed in parallel or performed in a different manner/order than that described or shown herein.

FIG. 1 is an example of a system 100 in which a base station receives Random-Access Request Signals from a plurality of user equipment (UE) devices located in a coverage area provided by the base station. For the example shown in FIG. 1, only a single base station 102 is shown, and three UE devices 106, 108, 110 are shown. However, any number of base stations and UE devices may be included in other examples. In the example shown in FIG. 1, base station 102 communicates with UE 1, 106 via communications link 112. Base station 102 communicates with UE 2, 108 via communications link 114. Base station 102 communicates with UE 3, 110 via communications link 116.

Figure 2A:
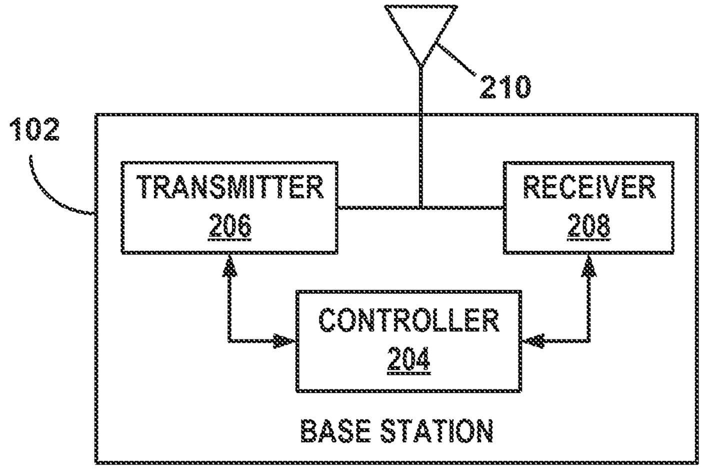
FIG. 2A is a block diagram of an example of the base station shown in FIG. 1.

FIG. 2A is a block diagram of an example of the base station shown in FIG. 1. In the example of FIG. 1, base station 102 provides wireless services to UE devices within coverage area 104 provided by base station 102. Although not explicitly shown in FIG. 1, coverage area 104 may be comprised of multiple cells. For the example shown in FIG. 1, base station 102, sometimes referred to as a gNodeB or gNB, can receive uplink messages from UE devices and can transmit downlink messages to the UE devices.

Base station 102 is connected to the network through a backhaul (not shown) in accordance with known techniques. As shown in FIG. 2A, base station 102 comprises controller 204, transmitter 206, receiver 208, and antenna 210 as well as other electronics, hardware, and code. Base station 102 is any fixed, mobile, or portable equipment that performs the functions described herein. The various functions and operations of the blocks described with reference to base station 102 may be implemented in any number of devices, circuits, or elements. Two or more of the functional blocks may be integrated in a single device, and the functions described as performed in any single device may be implemented over several devices.

For the example shown in FIG. 2A, base station 102 may be a fixed device or apparatus that is installed at a particular location at the time of system deployment. Examples of such equipment include fixed base stations or fixed transceiver stations. In some situations, base station 102 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, base station 102 may be a portable device that is not fixed to any particular location. Accordingly, base station 102 may be a portable user device such as a UE device in some circumstances.

Controller 204 includes any combination of hardware, software, and/or firmware for executing the functions described herein as well as facilitating the overall functionality of base station 102. An example of a suitable controller 204 includes code running on a microprocessor or processor arrangement connected to memory. Transmitter 206 includes electronics configured to transmit wireless signals. In some situations, transmitter 206 may include multiple transmitters. Receiver 208 includes electronics configured to receive wireless signals. In some situations, receiver 208 may include multiple receivers. Receiver 208 and transmitter 206 receive and transmit signals, respectively, through antenna 210. Antenna 210 may include separate transmit and receive antennas. In some circumstances, antenna 210 may include multiple transmit and receive antennas.

Transmitter 206 and receiver 208 in the example of FIG. 2A perform radio frequency (RF) processing including modulation and demodulation. Receiver 208, therefore, may include components such as low noise amplifiers (LNAs) and filters. Transmitter 206 may include filters and amplifiers. Other components may include isolators, matching circuits, and other RF components. These components in combination or cooperation with other components perform the base station functions. The required components may depend on the particular functionality required by the base station.

Transmitter 206 includes a modulator (not shown), and receiver 208 includes a demodulator (not shown). The modulator modulates the signals that will be transmitted and can apply any one of a plurality of modulation orders. The demodulator demodulates any uplink signals received at base station 102 in accordance with one of a plurality of modulation orders.

Figure 2B:
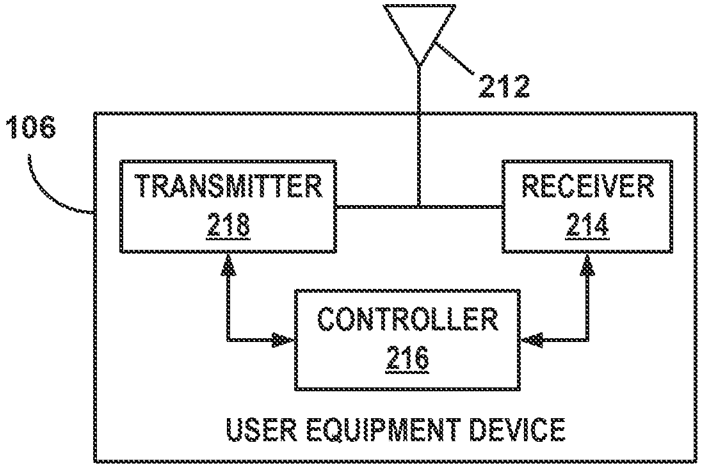
FIG. 2B is a block diagram of an example of the user equipment devices shown in FIG. 1.

FIG. 2B is a block diagram of an example of the user equipment devices shown in FIG. 1. As shown in FIG. 2B, user equipment device (UE) 106 comprises controller 216, transmitter 218, receiver 214, and antenna 212, as well as other electronics, hardware, and software code. UE device 106 may also be referred to herein as a UE or as a wireless communication device (WCD). UE 106 is wirelessly connected to a radio access network (not shown) via base station 102, which provides various wireless services to UE 106. For the example shown in FIG. 1, UE 106 operates in accordance with at least one revision of the 3rd Generation Partnership Project 5G New Radio (3GPP 5G NR) communication specification. In other examples, UE 106 may operate in accordance with other communication specifications. For the example shown in FIG. 1, UEs 106, 108, 110 have the components, circuitry, and configuration shown in FIG. 2B. However, one or more of UEs 106, 108, 110 may have components, circuitry, and configuration that differ from that shown in FIG. 2B, in other examples.

UE 106 is any fixed, mobile, or portable equipment that performs the functions described herein. The various functions and operations of the blocks described with reference to UE 106 may be implemented in any number of devices, circuits, or elements. Two or more of the functional blocks may be integrated in a single device, and the functions described as performed in any single device may be implemented over several devices.

Controller 216 includes any combination of hardware, software, and/or firmware for executing the functions described herein as well as facilitating the overall functionality of a user equipment device. An example of a suitable controller 216 includes software code running on a microprocessor or processor arrangement connected to memory. Transmitter 218 includes electronics configured to transmit wireless signals. In some situations, transmitter 218 may include multiple transmitters. Receiver 214 includes electronics configured to receive wireless signals. In some situations, receiver 214 may include multiple receivers. Receiver 214 and transmitter 218 receive and transmit signals, respectively, through antenna 212. Antenna 212 may include separate transmit and receive antennas. In some circumstances, antenna 212 may include multiple transmit and receive antennas.

Transmitter 218 and receiver 214 in the example of FIG. 2B perform radio frequency (RF) processing including modulation and demodulation. Receiver 214, therefore, may include components such as low noise amplifiers (LNAs) and filters. Transmitter 218 may include filters and amplifiers. Other components may include isolators, matching circuits, and other RF components. These components in combination or cooperation with other components perform the user equipment device functions. The required components may depend on the particular functionality required by the user equipment device.

Transmitter 218 includes a modulator (not shown), and receiver 214 includes a demodulator (not shown). The modulator can apply any one of a plurality of modulation orders to modulate the signals to be transmitted by transmitter 218. The demodulator demodulates received signals, in accordance with one of a plurality of modulation orders.

Figure 3:
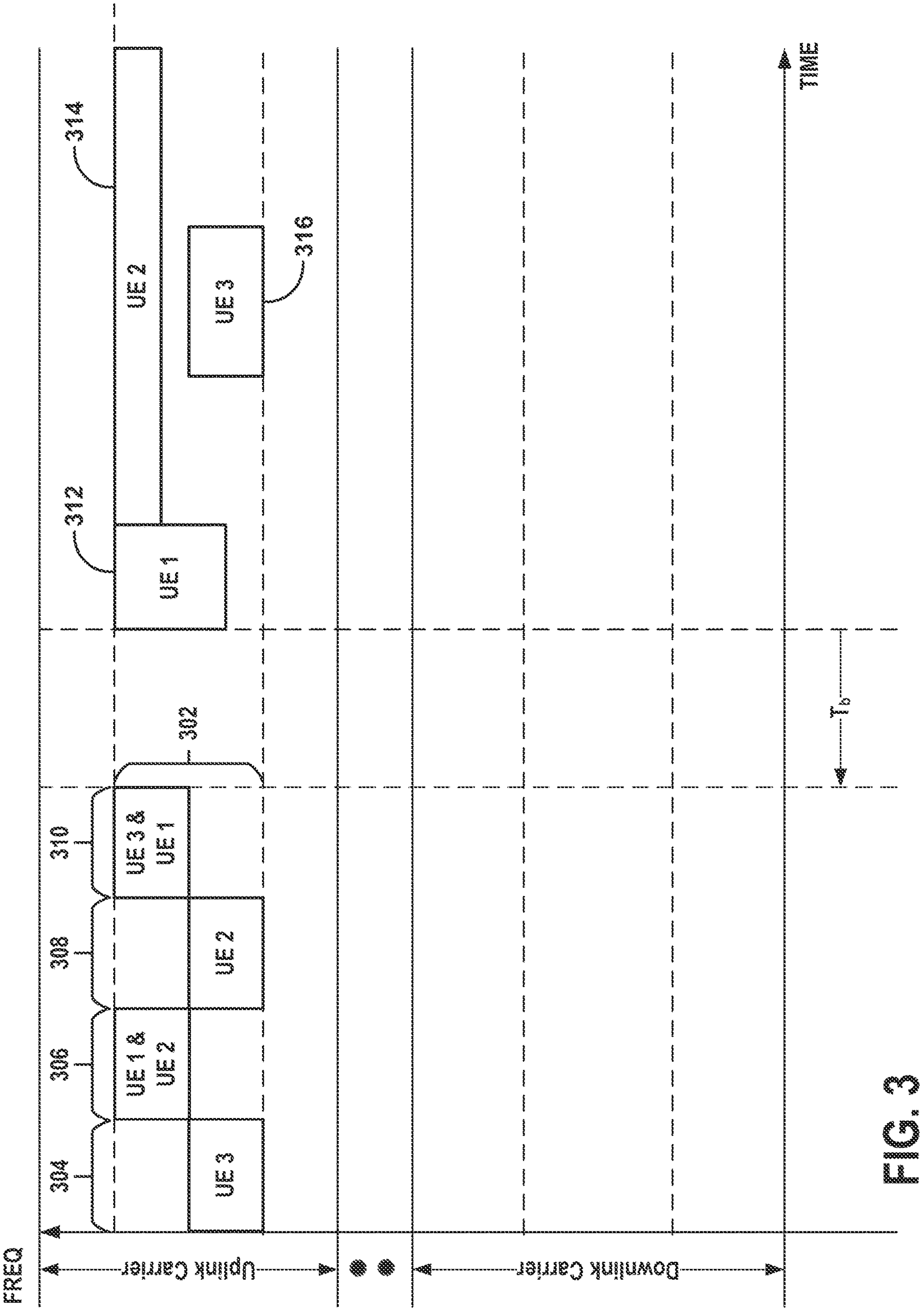
FIG. 3 is an example of the Random-Access Request Signal (RRS) transmissions sent from the UE devices of FIG. 1 within a Random-Access Channel (RACH) resource pool and the subsequent uplink transmissions sent by the UE devices.

In operation, when a UE wants to request uplink resources, the UE wakes-up, acquires synchronization by successfully detecting the synchronization signal, and transmits a number, d, of copies of a Random-Access Request Signal (RRS) over the same number, d, of slots picked by the UE among the N slots within a RACH resource pool, in some examples. The RACH resource pool is divided into frequency subchannels and time-slots, and each subchannel has a fixed set of subcarriers, in some examples. In further examples, the UE selects a set of subchannels in each time-slot in which to transmit the copies of the RRS, as shown in FIG. 3. One example of the physical structure of the RACH resource pool, which shows the subchannels and time-slots, is discussed more fully below in connection with FIG. 5.

In the example shown in FIG. 1, base station 102 receives, from UE 1, 106, a plurality of copies of a first RRS transmitted in a first set of resources selected from a RACH resource pool. Base station 102 also receives, from UE 2, 108, a plurality of copies of a second RRS transmitted in a second set of resources selected from the RACH resource pool. Base station 102 additionally receives, from UE 3, 110, a plurality of copies of a third RRS transmitted in a third set of resources selected from the RACH resource pool. In some examples, each of the plurality of copies of the first RRS contains a pointer to a resource location for each of the other copies of the first RRS. The copies of the second RRS and the third RRS may also contain pointers, in some examples.

In further examples, each of the plurality of copies of the RRS may indicate a Synchronization Signal Block (SSB) Index. In some of the examples in which the RRS indicates an SSB Index, the SSB Index may be associated with a distance of the UE device from the base station. In other examples in which the RRS indicates an SSB Index, the SSB Index may be associated with a direction of the UE device from the base station.

In some examples, base station 102 transmits, to UE device 106 prior to UE device 106 entering a sleep state, at least one message containing RACH resource pool configuration information. In some examples, the message containing the RACH resource pool configuration information is transmitted in System Information Block (SIB) messaging. In other examples, the message containing the RACH resource pool configuration information is transmitted in at least one dedicated Radio Resource Control (RRC) message. In further examples, the RACH resource pool configuration information contains RACH resource allocation information based at least partially on a mapping to one or more Synchronization Signal Block (SSB) Indices.

Figure 5:
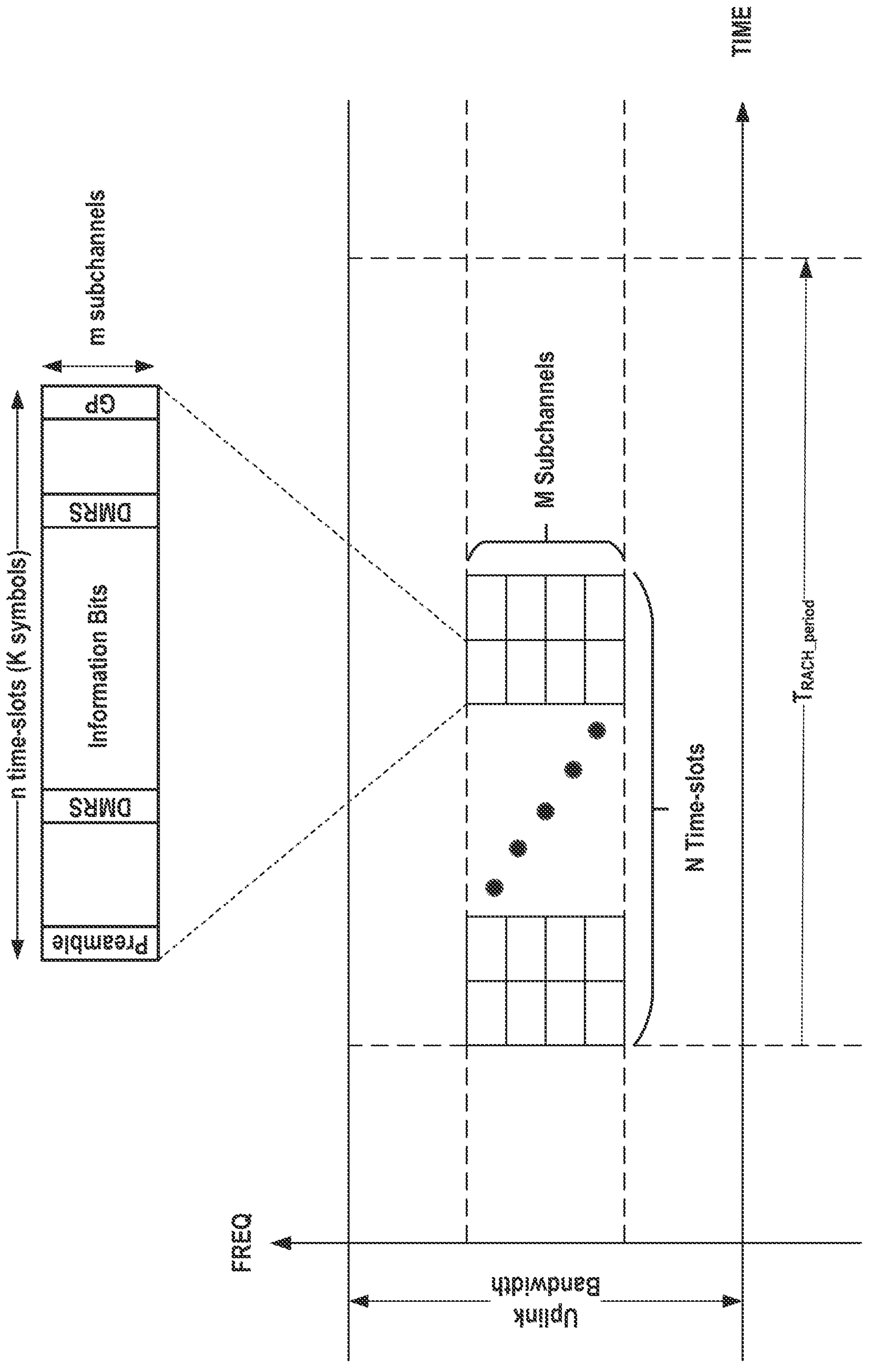
FIG. 5 is an example of the RACH resource pool design and the RRS physical layer design.

In some examples, the network pre-allocates the Random-Access Channel (RACH) resources in the uplink resources to be used for the RRS transmissions. FIG. 5 shows an example of a RACH resource pool design (shown on the frequency-time chart of FIG. 5) and the RRS physical layer design (shown as a detail view in the upper portion of FIG. 5). For the example shown in FIG. 5, each RACH resource pool is allocated a set of resources with a period of $T_{RACH\_period}$. Every RACH resource pool contains M subchannels and N time-slots. Each sub-channel is a continuous group of subcarriers. In some examples, the bandwidth of the subchannel (number of subcarriers per subchannel) and parameters M and N could vary depending upon the different numerology and size of the CP.

As shown in the RRS physical layer design of FIG. 5, a single copy of RRS transmission occupies a block of m×n, subchannels and time-slots, respectively. The parameter d represents the number of copies of the RRS that each UE is instructed to transmit. In some examples, the parameters $T_{RACH\_period}$, M, N, m, n, and d are pre-defined by the network and broadcasted to the UE devices via SIB/RRC messaging. These parameters are determined by the network based on the required coverage, traffic, interference, and channel conditions. The modulation and coding scheme (MCS) of the RRS is fixed and defined or configured during the UE's capabilities exchange with the base station. In some examples, the RRS transmit power is computed by the UE device based on the open-loop power control procedure discussed below.

In one example, if the network configures each RRS transmission with m=1 and n=1, then d copies of a 1×1 sized RRS are transmitted in the resources selected by the same UE within the M×N RACH resource pool. The resource selection could be random or determined by a UE-specific hashing function. In some examples, the UE-specific hashing function is assigned by the network. In other examples, the UE includes d−1 pointers in each RRS that point to a location of the other copies of the RRS that were transmitted by the UE within the same RACH resource pool. In the examples in which the UE-specific hashing function is used to determine the selected resources, the pointers are not required. In these examples, the UE uses its controller to perform a hashing function to select the set of resources, from the RACH resource pool, over which the d copies of the RRS will be transmitted.

The RRS physical layer design shown in FIG. 5 contains K symbols spanned over m×n subchannels and time-slots, respectively, carrying the information discussed herein. The optional preamble sequence helps detect the beginning of the RRS. The preamble sequence could be a fixed sequence or a function assigned by the network. The preamble portion is optional since the embedded Demodulation Reference Signal (DMRS) in the information part of the RRS could be used for the same purpose.

The RRS Information Bits carry all or a subset of the following information: the UE identifier (ID), the serving base station ID, a Buffer Status Report to indicate the amount of resources requested by the UE for its upcoming uplink transmission, the power headroom of the UE, Transmission Mode (e.g., multiple-input multiple-output (MIMO) parameters such Precoding Matrix Indicator (PMI) and Rank Indicator (RI)) and/or SSB Index (best direction), the d−1 pointers to the other copies within the same RACH resource pool (not needed if a UE-specific hashing function is used to select the RACH resources), and a DMRS symbol sequence that could be a function of the UE ID or the gNB assigned or a combination of both (the number of DMRS symbols could vary depending upon the channel conditions and the network configuration).

The optional Guard Period (GP) in the RRS physical layer design shown in FIG. 5 serves as a gap to avoid Inter-symbol Interference as described above.

As an alternative design, the RRS physical structure could be based on the existing 5G NR vehicle-to-everything (V2X) sidelink physical layer design. Similar to the NR sidelink physical layer design, the RSS could have a control channel and a data channel. The control channel would carry the UE ID, Serving gNB ID, pointers to the copies, etc. The data channel would carry the information bits such as the buffer status, power head room, SSB index, etc. Both channels would require their own respective DMRS.

FIG. 3 is an example of the physical layer mechanism by which RRS transmissions are sent from the UE devices of FIG. 1 within a RACH resource pool and the subsequent uplink transmissions are sent by the UE devices. For the example shown in FIG. 3, RACH resource pool 302 includes time-slots 304, 306, 308, and 310.

As shown in FIG. 3, an RRS for UE 3, 110 is transmitted in a singleton slot 304 and is correctly received and decoded by the base station receiver. A correctly decoded RRS is re-encoded and re-modulated, and the base station receiver removes the interference contribution of the correctly received RRS from the remaining d−1 slots containing other copies of the same RRS. This process proceeds iteratively, and the recovered copies of the RRS lead to solving other collisions.

As an example, referencing FIG. 3, a collision between a copy of the RRS of UE 1, 106 and a copy of the RRS of UE 2, 108 occurs in time-slot 306 of RACH resource pool 302. The base station is able to detect another copy of the RRS of UE 2, 108 in the next time-slot 308. Thus, the base station removes the interference caused by the copy of the RRS of UE 2, 108 from the previous time-slot 306 to correctly detect the copy of the RRS of UE 1, 106 in time-slot 306.

Similarly, a collision between a copy of the RRS of UE 3, 110 and a copy of the RRS of UE 1, 106 occurs in time-slot 310 of RACH resource pool 302. Since the base station is able to detect another copy of the RRS of UE 3, 110 in time-slot 304, the base station removes the interference caused by the copy of the RRS of UE 3, 110 from time-slot 310 to correctly detect the copy of the RRS of UE 1, 106 in time-slot 310.

Thus, in some examples, base station 102 receives a first copy of the RRS from UE 1, 106 and a first copy of the RRS from UE 2, 108 in a same RACH resource. Using its controller 204, base station 102 removes interference caused by the first copy of the RRS from UE 1, 106 from the same RACH resource in which the first copy of the RRS from UE 1, 106 and the first copy of the RRS from UE 2, 108 were received. In some examples, base station 102 utilizes the successive interference cancellation (SIC) technique to remove the interference.

Figure 4:
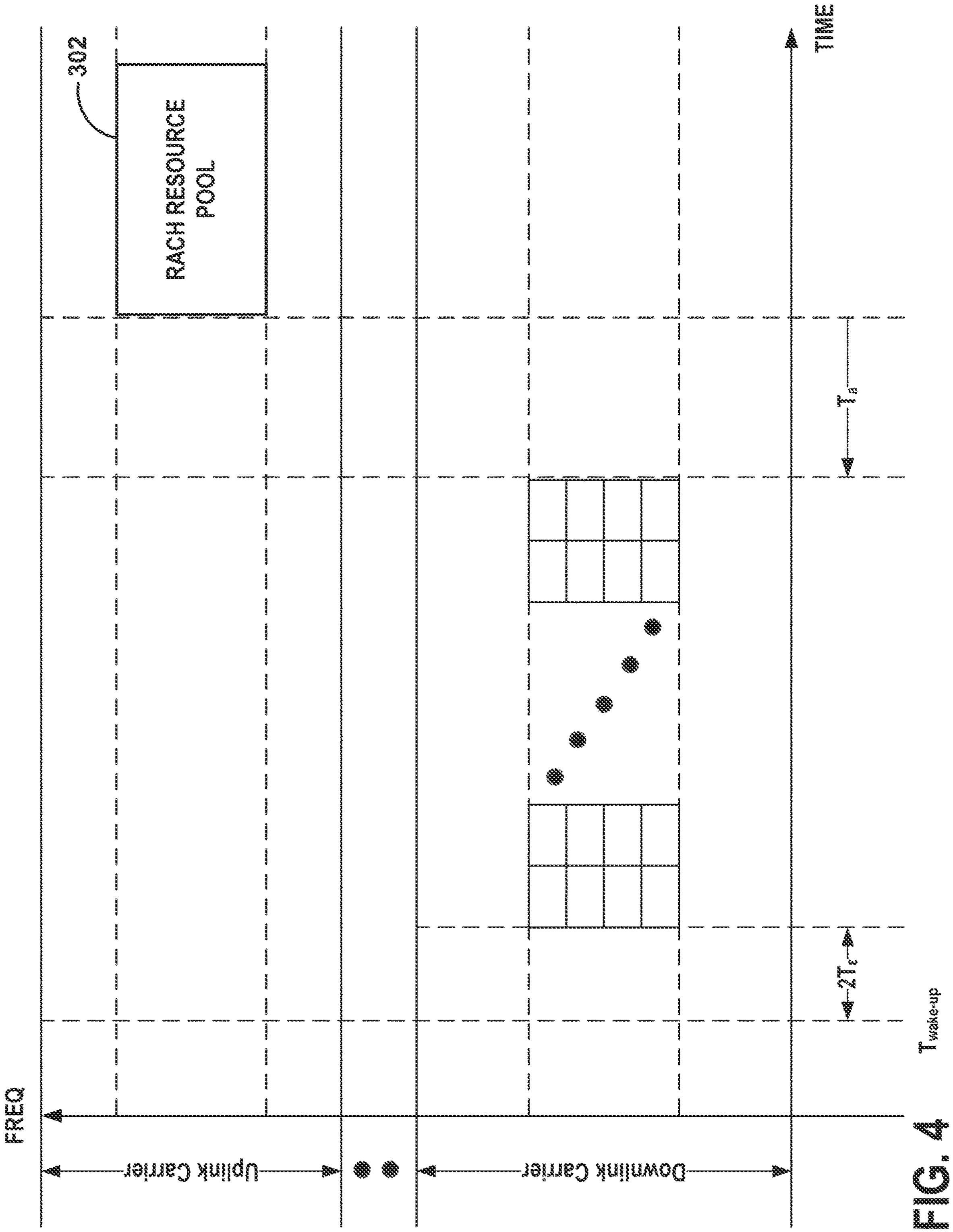
FIG. 4 is an example of a synchronization signal block transmitted at a predetermined time interval before a time-slot in which the RRS transmissions are transmitted.

In obtaining synchronization before transmitting the copies of the RRS, a UE may acquire synchronization using a conventional Synchronization Signal Block (SSB) acquisition method, in which case the synchronization signal (SS) transmission $T_a$ time-period or slots is not required. However, the SS transmission design shown in FIG. 4 may be beneficial from an energy-saving perspective. FIG. 4 is an example of an SSB transmitted at a predetermined time interval, $T_a$, before the first time-slot of the RACH resource pool 302 in which the UEs begin to transmit the copies of their respective RRSs.

In some examples, one or more synchronization signal parameters associated with the SSB are transmitted, from the base station to the UEs, in one or more dedicated Radio Resource Control (RRC) messages. In other examples, the one or more synchronization signal parameters are transmitted via Media Access Control (MAC) Control Element (CE) signaling. In further examples, the one or more synchronization signal parameters can be pre-configured, provided during registration of the UE device, part of the system information transmitted in System Information Block (SIB) messaging, etc.

In some examples, base station 102 utilizes antenna 210 and receiver 208 to receive a UE capability message containing Voltage-Controlled Crystal Oscillator (VCXO) tolerance information for UE device 106. In some examples, base station 102 utilizes controller 204 to schedule transmission of the synchronization signal based, at least partially, on the VCXO tolerance information for UE device 106.

In some examples, base station 102 utilizes controller 204 to determine a projected wake-up time, $T_{wake-up}$, for UE device 106 and begins transmitting, via transmitter 206 and antenna 210, the synchronization signal during a time interval that begins at the projected wake-up time. This time interval, which begins at $T_{wake-up}$, lasts for a period of time that is based, at least partially, on a clock-drift error value, $T_\varepsilon$, associated with UE device 106, in some examples. For the example shown in FIG. 4, it is assumed that UE device 106 has a clock-drift error value of $\pm T_\varepsilon$ and that base station 102 has the flexibility to transmit the synchronization signal block anytime within a time interval starting at $T_{wake-up}$. As mentioned above, this time interval, which begins at $T_{wake-up}$, lasts for a period of time that is based, at least partially, on a clock-drift error value, $T_\varepsilon$, associated with UE device 106, in some examples. In the example shown in FIG. 4, the time interval begins at $T_{wake-up}$ and lasts for a duration of $2T_\varepsilon$. However, the time interval that begins at $T_{wake-up}$ may have any suitable duration, in other examples. In some examples, by default, base station 102 assumes that $T_\varepsilon=0$ since the UEs are capable of adjusting for their clock-drift error.

In the example shown in FIG. 4, base station 102 transmits, on a Physical Downlink Shared Channel (PDSCH), a synchronization signal to UE device 106. In some examples, the synchronization signal is transmitted at a pre-determined time interval, $T_a$, before a time-slot in which the UEs begin transmitting their respective RRSs using resources selected from the RACH resource pool. Stated differently, transmission of the synchronization signal is completed by the beginning of the time interval, $T_a$, which is discussed more fully below.

In some examples, the synchronization signal comprises a plurality of copies of a sequence. In the example shown in FIG. 1, base station 102 transmits, a plurality of copies of the sequence spread across at least a portion of downlink frequency resources utilized to transmit the synchronization signal and spread across at least a portion of downlink time resources utilized to transmit the synchronization signal. In some examples, base station 102 uses controller 204 to determine the number of copies based on at least one of the following: carrier bandwidth availability, a Coverage Enhancement (CE) level, a received downlink signal quality or strength reported by UE device 106, and a VCXO tolerance of UE device 106. The copies of the sequence are collectively referred to herein as the synchronization signal block.

The copies of the sequence may or may not be allocated in consecutive resources. In some examples, each copy is spread out in frequency and time to achieve greater frequency and time diversity, respectively. In further examples, a sequence spans over a long period of time, providing much greater cross-correlation properties to achieve higher successful detection rate by UE device 106. In examples in which the copies of the sequence are not allocated in consecutive resources, data for the UE devices may occupy the time-frequency resources of the PDSCH that are interspersed between the non-consecutive resources that are occupied by the copies of the sequence.

In some examples, base station 102 anticipates the wake-up time of the UEs and schedules the transmission of the synchronization signal block ahead of the upcoming RACH resources. One advantage of the example of FIG. 4 is that all of the copies of the sequence are transmitted in a short-period of time, giving the opportunity to the UEs to acquire resynchronization much faster, resulting in a significantly reduced ON time for the UE devices. In some examples, UE device 106 must receive all of the copies of the sequence contained in the synchronization signal block to achieve successful detection.

In some examples, the scheduling of the synchronization signal block is similar to the transmission of a data packet to a UE except that it is "pre-determined." For example, the location of the synchronization signal block relative to the RACH resources allows UE device 106 to determine the subframe number within a frame upon successful detection. As shown in FIG. 4, the end of the synchronization signal block is transmitted at a time interval. $T_a$, ahead of the upcoming RACH resources, which is known to the UE devices. This predetermined time interval, $T_a$, helps the UEs determine the frame timing when the UEs wake-up without the knowledge of the subframe boundary locations.

In some examples, the synchronization signal parameters are configured by base station 102 and conveyed to UE device 106 before UE device 106 enters a sleep state. In further examples, the synchronization signal parameters may be adjusted for each UE (or UE group) according to its operational carrier-bandwidth, Coverage Enhancement level, and VCXO tolerance.

In some examples, a system that operates in accordance with the 5G NR standard is preferred since it has a much more flexible slot-structure design compared to LTE/LTE-A. In 5G NR, each time-slot consists of 14 orthogonal frequency-division multiplexing (OFDM) symbols. In this design, the base station does not transmit on a physical downlink control channel (PDCCH) and allocates the whole time-slot for PDSCH transmission.

Regardless of the manner in which the UEs obtain synchronization, once the UEs have transmitted their copies of their respective RRSs to the base station as shown in FIG. 3, time-period $T_b$ gives a time-gap to the network (e.g., base station) to detect collisions occurring during the RACH transmissions and decode the RRSs. Once the RRSs are successfully decoded, base station 102 transmits uplink grants to the UEs using PDCCH, in some examples. In further examples, the uplink grants also contain a time-adjustment command, which requires an additional field in the existing PDCCH design if the time-adjustment command is transmitted as part of the PDCCH.

After the pre-defined $T_b$ time-period, the scheduled UEs transmit their respective Physical Uplink Shared Channel (PUSCH) transmissions based on the uplink grants received from the base station. In the example shown in FIG. 3, UE 1, 106 sends uplink transmissions using uplink resources 312 that correspond to the grant UE 1, 106 received from the base station; UE 2, 108 sends uplink transmissions using uplink resources 314 that correspond to the grant UE 2, 108 received from the base station; and UE 3, 110 sends uplink transmissions using uplink resources 316 that correspond to the grant UE 3, 110 received from the base station.

In some examples, the UE may perform an open-loop power control (OLPC) procedure to determine a power at which to transmit the copies of its RRS. In one example, the UE's RRS transmit power is a function of the downlink received signal strength, $P_{DL\ RX}$ such that $P_{TX}=f(P_{DL\ RX})$. The UE measures and computes the pathloss $P_{DL\ RX}$. The function f is defined as part of the specifications. The terms in the function f are based on the interference, channel, and traffic conditions. If the base station is unable to detect the first RRS transmission burst, then the UE retransmits another RACH burst with additional transmit power in the next available RACH resource pool after the defined timer expires. The additional power steps are defined by the specifications. This procedure is similar to the existing 5G NR RACH preamble retransmissions.

The OLPC-based transmit power ensures the received power strength from the UEs reach the base station receiver at similar power levels to reduce the near-far effect. The near-far effect could be further mitigated by allocating different RACH resource pools and/or resources within the RACH resource pool for different UEs located at different distances and/or different directions from the base station. For example, the cell-edge UEs are assigned RACH resource pool A, and the UEs located close to the base station are assigned RACH resource pool B. In other examples, UEs located in a first direction from the base station are assigned to RACH resource pool X, and UEs located in in a second direction from the base station are assigned to RACH resource pool Y.

The designs shown herein complement the existing 5G NR beam association design. For example, the network allocates multiple RACH resource pools and/or resources within the RACH resource pool mapped to different associated SSB Indices as done in 5G NR. Moreover, the designs shown herein reduce latency and the signaling overhead since receiving the Random-Access Response (RAR) and/or Msg 4 from the network is not required. Also, the delay due to unsuccessful preamble detections is significantly reduced or avoided compared to the 4-Step and 2-Step RACH procedures.

Figure 6:
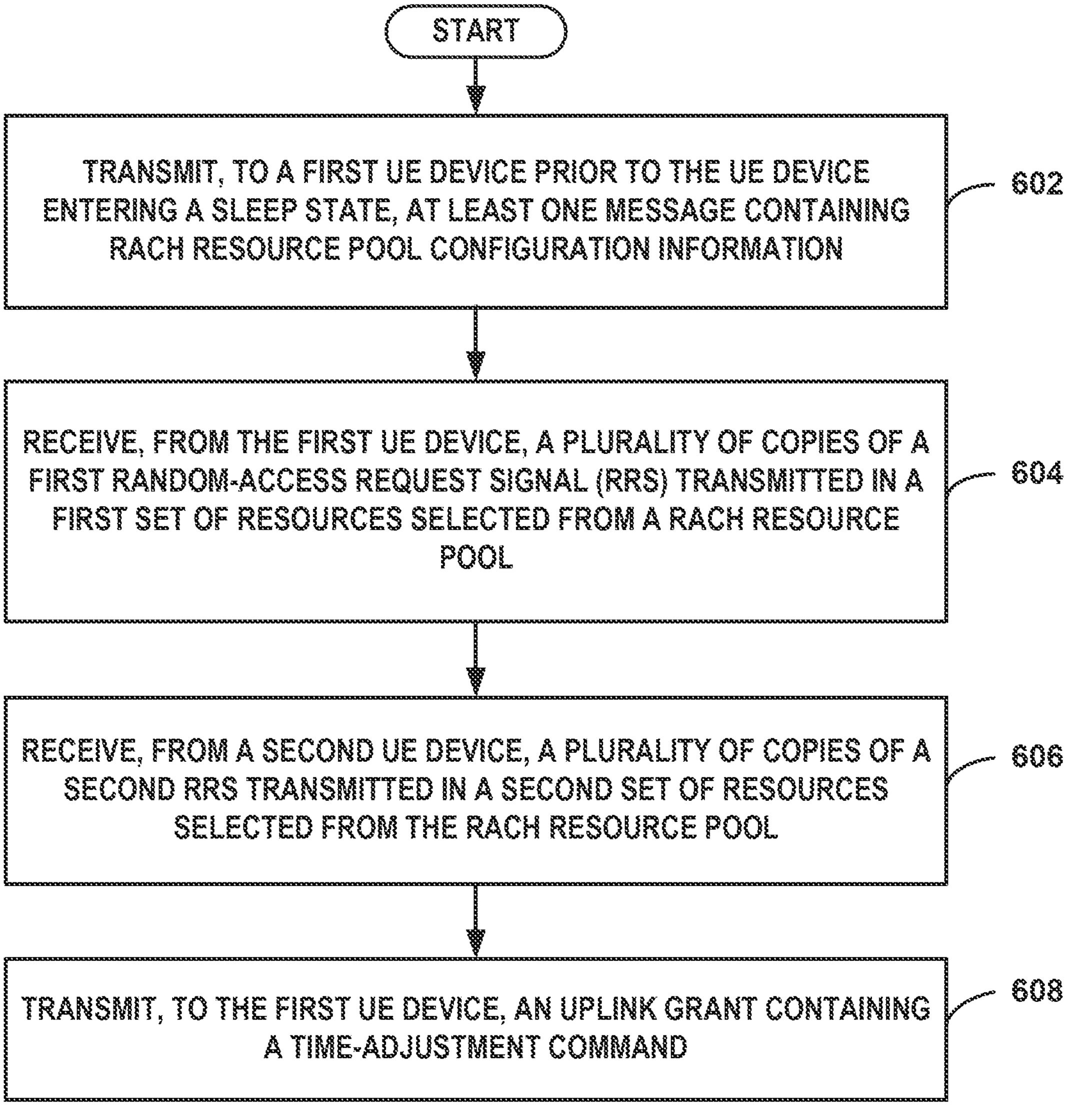
FIG. 6 is a flowchart of an example of a method in which a base station transmits, to a first UE device prior to the first UE device entering a sleep state, at least one message containing RACH resource pool configuration information.

FIG. 6 is a flowchart of an example of a method in which a base station transmits, to a first UE device prior to the first UE device entering a sleep state, at least one message containing RACH resource pool configuration information. The base station receives, from the first UE device, a plurality of copies of a first RRS transmitted in a first set of resources selected from a RACH resource pool. The base station also receives, from a second UE device, a plurality of copies of a second RRS transmitted in a second set of resources selected from the RACH resource pool. After decoding the RRS transmissions, the base station transmits, to the first UE device, an uplink grant containing a time-adjustment command.

At step 602, a base station transmits, to a first UE device prior to the first UE device entering a sleep state, at least one message containing RACH resource pool configuration information. At step 604, the base station receives, from the first UE device, a plurality of copies of a first RRS transmitted in a first set of resources selected from a RACH resource pool. At step 604, the base station receives, from a second UE device, a plurality of copies of a second RRS transmitted in a second set of resources selected from the RACH resource pool. At step 608, the base station transmits, to the first UE device, an uplink grant containing a time-adjustment command.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A base station comprising:

a receiver configured to:

receive, from a first user equipment (UE) device, a first plurality of copies of a first Random-Access Request Signal (RRS) transmitted in a first set of resources selected from a Random-Access Channel (RACH) resource pool, the first plurality of copies comprising a first RRS first copy transmitted in a first time resource and a first RRS second copy transmitted in a second time resource, and receive, from a second UE device, a second plurality of copies of a second RRS transmitted in a second set of resources selected from the RACH resource pool, the second plurality of copies comprising a second RRS first copy transmitted in the second time resource; and a controller configured to correctly detect the first RRS first copy and to use the first RRS first copy to remove interference caused by the first RRS second copy to correctly detect the second RRS first copy in the second time resource.

2. The base station of claim 1, wherein each of the plurality of copies of the first RRS contains a pointer to a resource location for each of the other copies of the first RRS.

3. The base station of claim 1, wherein each of the plurality of copies of the first RRS indicates a Synchronization Signal Block (SSB) Index.

4. The base station of claim 3, wherein the SSB Index is associated with a distance of the first UE device from the base station.

5. The base station of claim 3, wherein the SSB Index is associated with a direction of the first UE device from the base station.

6. The base station of claim 1, further comprising:

a transmitter configured to transmit, to the first UE device prior to the first UE device entering a sleep state, at least one message containing RACH resource pool configuration information.

7. The base station of claim 6, wherein the transmitter is further configured to transmit the at least one message containing RACH resource pool configuration information in System Information Block (SIB) messaging.

8. The base station of claim 6, wherein the transmitter is further configured to transmit the at least one message containing RACH resource pool configuration information in at least one dedicated Radio Resource Control (RRC) message.

9. The base station of claim 6, wherein the RACH resource pool configuration information contains RACH resource allocation information based at least partially on a mapping to one or more Synchronization Signal Block (SSB) Indices.

10. The base station of claim 1, wherein the first time resource is first time slot and the second time resource is a second time slot.

11. The base station of claim 1, further comprising:

a transmitter configured to transmit, to the first UE device, an uplink grant containing a time-adjustment command.

12. A first user equipment (UE) device comprising:

a transmitter configured to transmit, to a base station, a first plurality of copies of a first Random-Access Request Signal (RRS) transmitted in a first set of resources selected from a Random-Access Channel (RACH) resource pool, the first plurality of copies comprising a first RRS first copy transmitted in a first time resource; and a receiver configured to receive, from the base station, an uplink grant message transmitted at least partially in response to the base station removing interference to correctly detect the first RRS first copy in the first time resource, the removing of the interference being performed based on a second plurality of copies of a second RRS transmitted by a second UE device in a second set of resources selected from the RACH resource pool, the second plurality of copies comprising a second RRS first copy transmitted in the first time resource and a second RRS second copy transmitted in a second time resource, the removing of the interference comprising removing interference caused by the second RRS first copy using the second RRS second copy correctly detected in the second time resource.

13. The first UE device of claim 12, wherein each of the plurality of copies of the first RRS contains a pointer to a resource location for each of the other copies of the first RRS.

14. The first UE device of claim 12, wherein each of the plurality of copies of the first RRS indicates a Synchronization Signal Block (SSB) Index.

15. The first UE device of claim 14, wherein the SSB Index is associated with a distance of the first UE device from the base station.

16. The first UE device of claim 14, wherein the SSB Index is associated with a direction of the first UE device from the base station.

17. The first UE device of claim 12, further comprising:

a receiver configured to receive, from the base station prior to the first UE device entering a sleep state, at least one message containing RACH resource pool configuration information.

18. The first UE device of claim 17, wherein the receiver is further configured to receive the at least one message containing RACH resource pool configuration information in System Information Block (SIB) messaging.

19. The first UE device of claim 17, wherein the receiver is further configured to receive the at least one message containing RACH resource pool configuration information in at least one dedicated Radio Resource Control (RRC) message.

20. The first UE device of claim 17, wherein the RACH resource pool configuration information contains RACH resource allocation information based at least partially on a mapping to one or more Synchronization Signal Block (SSB) Indices.

21. The first UE device of claim 12, further comprising:

a controller configured to perform an open-loop power control procedure to determine a power at which to transmit the plurality of copies of the first RRS.

22. The first UE device of claim 12, further comprising:

a controller configured to perform a hashing function to select the first set of resources from the RACH resource pool.

23. The first UE device of claim 12, further comprising:

a receiver configured to receive, from the base station, an uplink grant containing a time-adjustment command.

* * * * *